US011041955B2

(12) United States Patent
Schmalenberg et al.

(10) Patent No.: US 11,041,955 B2
(45) Date of Patent: Jun. 22, 2021

(54) 2D PHOTONIC GRATING

(71) Applicant: Toyota Motor Engineering & Manufacturing North America, Inc., Erlanger, KY (US)

(72) Inventors: Paul Donald Schmalenberg, Ann Arbor, MI (US); Tsuyoshi Nomura, Erlanger, KY (US); Jae Seung Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 771 days.

(21) Appl. No.: 15/675,305

(22) Filed: Aug. 11, 2017

(65) Prior Publication Data

US 2019/0049584 A1    Feb. 14, 2019

(51) Int. Cl.

| *G01S 17/36* | (2006.01) |
| *G01S 17/42* | (2006.01) |
| *G01S 17/89* | (2020.01) |
| *G01S 7/4911* | (2020.01) |
| *G01S 7/481* | (2006.01) |
| *G01S 17/931* | (2020.01) |

(52) U.S. Cl.
CPC ............ *G01S 17/36* (2013.01); *G01S 7/4814* (2013.01); *G01S 7/4817* (2013.01); *G01S 7/4911* (2013.01); *G01S 17/42* (2013.01); *G01S 17/89* (2013.01); *G01S 17/931* (2020.01)

(58) Field of Classification Search
CPC ...... F21V 13/02; F21V 13/12; F21V 2200/20; F21V 9/08; G01S 17/88

USPC .................................................. 362/600–634
See application file for complete search history.

(56) References Cited

U.S. PATENT DOCUMENTS

| 8,982,313 | B2 | 3/2015 | Escuti et al. |
| 9,104,086 | B1 | 8/2015 | Davids et al. |
| 9,316,534 | B1 | 4/2016 | Kondratko et al. |
| 9,476,981 | B2 | 10/2016 | Yaacobi et al. |
| 9,638,941 | B2 | 5/2017 | You et al. |
| 2004/0146240 | A1* | 7/2004 | Zhang ................ H04Q 11/0005 385/24 |

(Continued)

FOREIGN PATENT DOCUMENTS

WO  PCT/US2015/033432  *  5/2015 ............ B60W 40/02

*Primary Examiner* — William J Carter
(74) *Attorney, Agent, or Firm* — Christopher G. Darrow; Darrow Mustafa PC

(57) ABSTRACT

Systems, methods, and other embodiments described herein relate to an antenna formed by a silicon photonic two-dimensional grating. In one embodiment, a phased-array light detection and ranging (LIDAR) device includes a phase shifting array that separately shifts a phase of a source light wave to produce separate light waves with distinct phases. The LIDAR device includes optical inputs operably connected with the phase shifting array to receive the separate light waves. The LIDAR device includes a photonic grating operably connected with the optical inputs to receive the separate light waves and having a body that is disposed within a substrate with a face of the body exposed within the substrate. The photonic grating including grating structures exposed within the face. The grating structures redirect the separate light waves to emit the light waves from the photonic grating to form the beam of light.

20 Claims, 7 Drawing Sheets

(56) References Cited

U.S. PATENT DOCUMENTS

| | | | |
|---|---|---|---|
| 2011/0286063 A1* | 11/2011 | McGrew | G02F 1/292 359/15 |
| 2013/0266319 A1 | 10/2013 | Bodan et al. | |
| 2015/0369976 A1 | 12/2015 | Magnusson | |
| 2018/0003805 A1* | 1/2018 | Popovich | G02B 26/106 |

* cited by examiner

2D PHOTONIC GRATING

TECHNICAL FIELD

The subject matter described herein relates in general to a silicon photonic device and, more particularly, to a two-dimensional phased array antenna that includes a two-dimensional photonic grating comprised of a plurality of grating structures.

BACKGROUND

Environmental perception can be a challenge for electronic devices. For example, electronic devices that operate autonomously such as robots and vehicles generally use one or more sensors to perceive a surrounding environment so that the devices can determine a location within the environment and map objects and obstacles. In this way, the autonomous electronic devices can determine paths through the environment when autonomously navigating and/or provide assistance to an operator in order to avoid objects or otherwise map the environment. However, sensors such as light/laser detection and ranging (LIDAR/LADAR) sensors can be cumbersome due to large sizes/weights associated with such devices and moving parts that, for example, rotate in order to provide a wide scanning field. Moreover, approaches that implement closely spaced linear antennas can suffer from difficulties with cross-coupling between the antennas, which can interfere with an emitted signal thereby degrading optical signal quality.

SUMMARY

An example of a solid-state phased array LIDAR/LADAR that is configured with an antenna in the form of a two-dimensional (2D) photonic grating is presented herein. In one embodiment, the 2D photonic grating is a monolithic structure that includes sub-antennas in the form of grating structures. The grating structures are integrated with the 2D photonic grating and function to emit light waves provided into the photonic grating while avoiding difficulties from cross-coupling. Thus, the grating structures can be closely spaced in comparison to individual linear antennas to provide a photonic phased-array antenna with improved optical signal quality. In this way, a solid-state LIDAR/LADAR device is provided that avoids size and weight limitations of other devices that utilize mechanical scanning elements while also avoiding difficulties with cross-coupling.

In one embodiment, a photonic phased array apparatus for steering a beam of light is disclosed. The apparatus includes a photonic grating having a body that is disposed within a substrate and a face of the body exposed within the substrate. The photonic grating including grating structures exposed within the face and extending perpendicular to the face within the body. The grating structures being arranged in a grid pattern across the photonic grating. The apparatus further includes optical inputs operably connected with the photonic grating along at least one side of the body that is perpendicular to the face. The optical inputs provide separate light waves in parallel into the photonic grating and in a parallel direction with the face that is perpendicular to the grating structures. The grating structures redirect the separate light waves to emit the light waves from the photonic grating to form the beam of light.

In one embodiment, a phased-array light detection and ranging (LIDAR) device is disclosed herein. The LIDAR device includes a phase shifting array that separately shifts a phase of a source light wave to produce separate light waves with distinct phases. The LIDAR device includes optical inputs operably connected with the phase shifting array to receive the separate light waves. The LIDAR device includes a photonic grating operably connected with the optical inputs to receive the separate light waves and having a body that is disposed within a substrate with a face of the body exposed within the substrate. The photonic grating including grating structures exposed within the face. The grating structures redirect the separate light waves to emit the light waves from the photonic grating to form the beam of light.

In one embodiment, a method for steering a beam of light using a two-dimensional photonic grating is disclosed. The method includes, in response to an electronic control signal that indicates a requested direction in which to steer the beam of light, adjusting, using an array of phase shifters, a phase of a light source to produce separate light waves with distinct phases. The method includes providing, from the array of phase shifters via optical inputs, the separate light waves to the two-dimensional photonic grating. The method includes emitting, using grating structures embedded in the two-dimensional photonic grating, the separate light waves to produce the beam of light that is directed in the requested direction.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with an optical phased array antenna comprising a two-dimensional photonic grating are disclosed herein. As previously indicated, mechanical-based LIDAR sensors that include rotating elements for physically moving light emitting components to scan across an environment can be cumbersome. The cumbersome nature of these devices can be due to increased size and weight characteristics in addition to issues with failure of the mechanical elements over time. Moreover, further approaches that forgo mechanical elements generally implement a plurality of individual linear antennas that are closely spaced, suffer from difficulties with cross-coupling, and are also generally larger in size than is desired.

Accordingly, in one embodiment, an optical phased-array antenna for a LIDAR sensor is implemented using a monolithic antenna structure in the form of a two-dimensional photonic grating. For example, the two-dimensional photonic grating is embodied as a single integrated structure with embedded grating structures within the photonic grating. The grating structures direct separate light waves out of the face of the photonic grating to form a beam of light that is directed in a particular direction as controlled through adjusting various characteristics of the light waves and/or the photonic grating. In this way, the LIDAR sensor can scan an environment by changing where the beam of light is directed without incorporating mechanical moving elements and while also avoiding difficulties with cross-coupling as can be encountered in configurations implementing closely spaced linear antennas.

Figure 1:
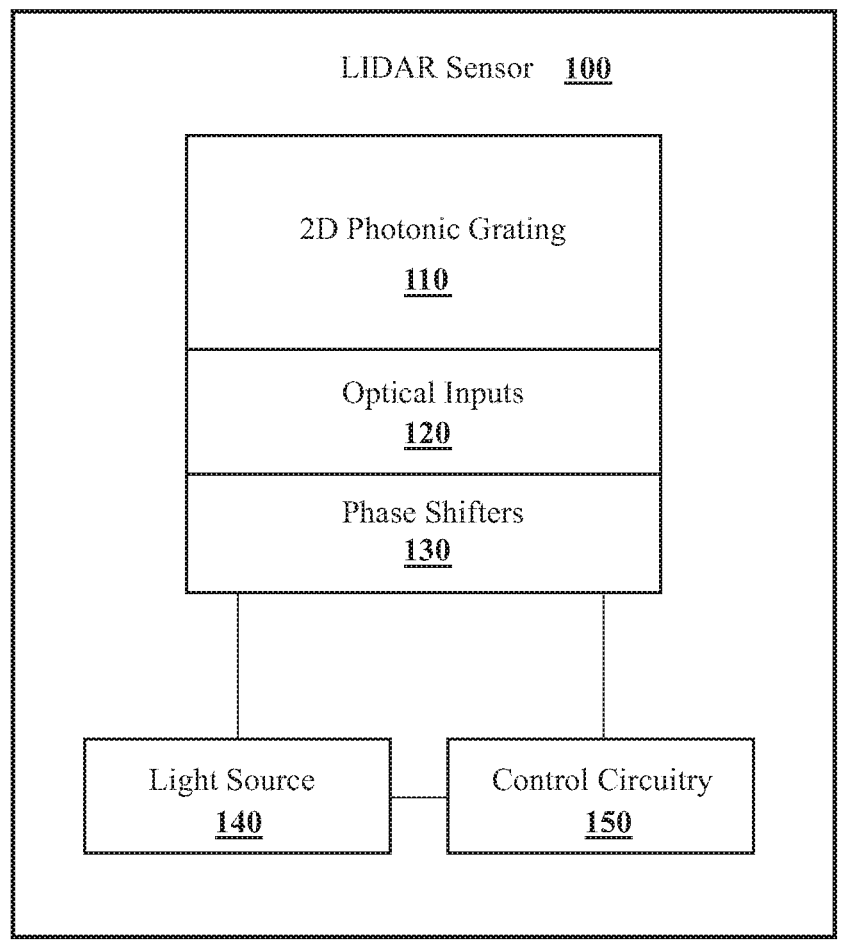
FIG. 1 is a block diagram illustrating one embodiment of a LIDAR sensor.

Referring to FIG. 1, an example of a LIDAR sensor 100 is illustrated. As an initial matter, while a LIDAR is generally discussed herein, the disclosed photonic grating and other components are also applicable to be being implemented in further systems such as LADAR, and/or other optical phased array systems. Thus, the embodiments disclosed herein are not limited to LIDAR sensors. Moreover, the disclosed LIDAR sensor 100 is generally discussed as being implemented along with electronic devices such as robots, vehicles, and so on, however, it should be appreciated that the disclosed devices, systems, and methods can be integrated with the noted devices or can be provided as standalone sensors. Additionally, as used herein, a "vehicle" is any form of motorized transport. In one or more implementations, a vehicle refers to an automobile. While arrangements will be described herein with respect to automobiles, it will be understood that embodiments are not limited to automobiles. In some implementations, the vehicle may be any other form of motorized transport that, for example, benefits from data provided via the LIDAR sensor 100.

As an additional note, the LIDAR sensor 100 also includes various elements. It will be understood that in various embodiments it may not be necessary for the LIDAR sensor 100 to have all of the elements shown in FIG. 1. The LIDAR sensor 100 can have any combination of the various elements shown in FIG. 1. Further, the LIDAR sensor 100 can have additional elements to those shown in FIG. 1. In some arrangements, the LIDAR sensor 100 may be implemented without one or more of the elements shown in FIG. 1. Further, while the various elements are shown as being located within the LIDAR sensor 100 in FIG. 1, it will be understood that one or more of these elements can be located external to the LIDAR sensor 100. Further, the elements shown may be physically separated by large distances.

Some of the possible elements of the LIDAR sensor 100 are shown in FIG. 1 and will be described along with subsequent figures. However, for purposes of brevity of this description, some elements that may be included within the LIDAR sensor 100 have been omitted from FIG. 1 and the associated discussion. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the LIDAR sensor 100 includes a two-dimensional (2D) photonic grating 110 that is implemented as an optical phased-array antenna to provide a beam of light from the LIDAR sensor 100. In one embodiment, the 2D photonic grating has a substantially rectangular outline and thus has a body that is, for example, provided as a cuboid structure that extends into a substrate. That is, the photonic grating 110 has a substantially planar face that is exposed within the substrate. In general, the grating 110 is placed within the LIDAR sensor 100 in a manner so that light can be emitted from the grating 110 out of the LIDAR sensor 100 and into a surrounding environment. Thus, the substrate generally surrounds the body of the photonic grating 110 on all but one side (i.e., a face). Of course, in further aspects, the grating 110 can emit the light into another structure (e.g., a second grating) as will be discussed subsequently. In one embodiment, the body of the photonic grating 110 is a liquid crystal compound, a silicon-based compound, or another suitable compound with characteristics that facilitate use as an optical antenna. In general, the body of the photonic grating is manufactured to be transparent to a wavelength of light provided by a light source 140 and to provide efficient transmission of the light. As an initial matter, it should be appreciated that while this discussion references light, light waves, optical signals, and beams of light, in general, these terms are used to refer to electromagnetic radiation with a particular wavelength (e.g., approximately 100 nm to 1600 nm).

The face of the photonic grating 110 can be rectangular, rhomboid, circular, triangular, or another suitable shape. In either case, the photonic grating 110 is a three-dimensional structure that extends into the substrate (e.g., silicon-based substrate). Accordingly, the photonic grating 110 is referred to as a 2D photonic grating from the perspective that the photonic grating 110 emits light waves along two separate axes (e.g., x-axis and y-axis) and controls a beam of light formed therefrom in two separate dimensions such that the beam of light is steered to a requested/desired point within a projected 2-D grid.

Figure 2:
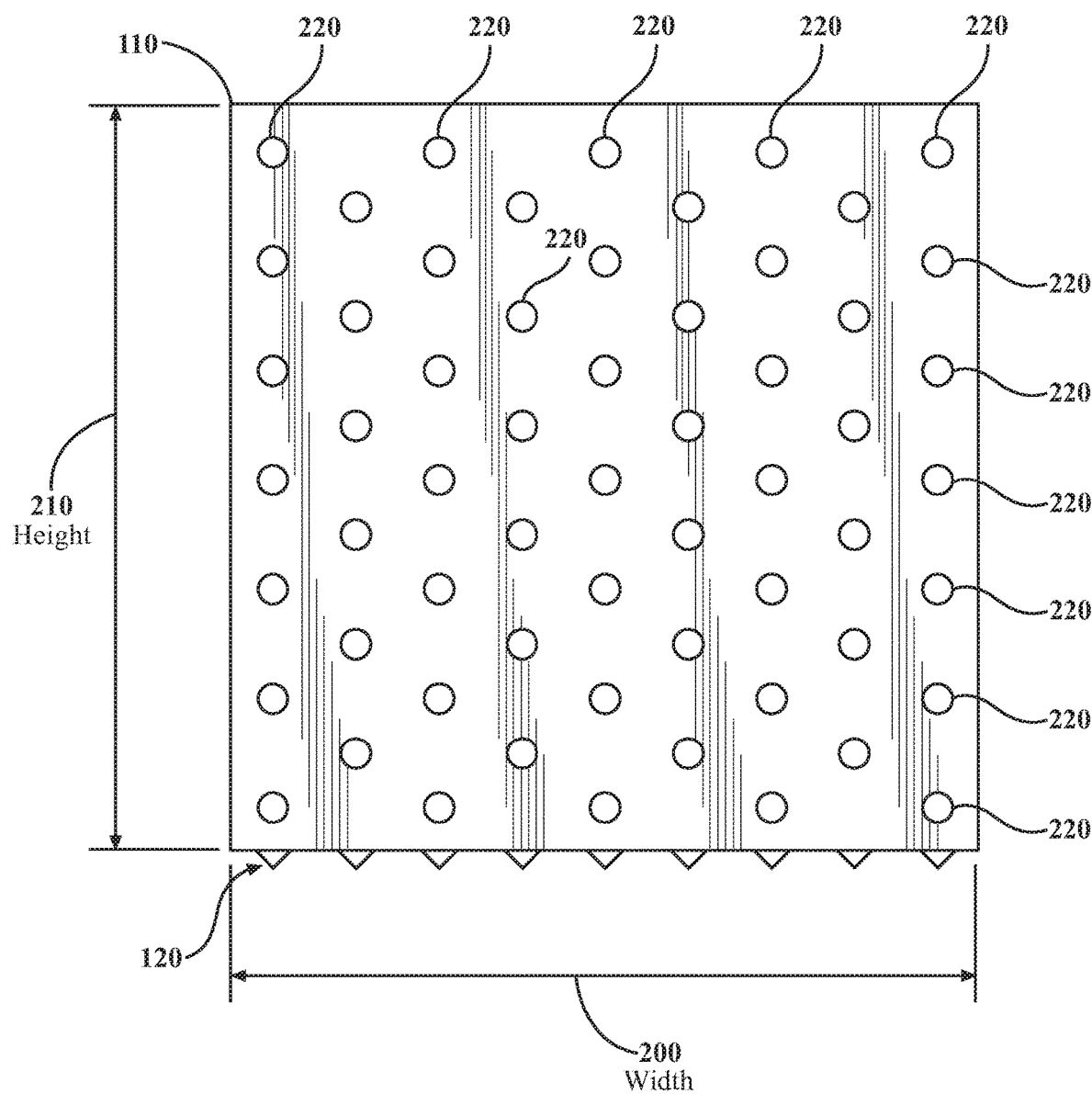
FIG. 2 is a top-down view of one embodiment of a 2D photonic grating including grating structures.

With reference to FIG. 2, a top-down view of the photonic grating 110 is further illustrated. As shown in FIG. 2, the photonic grating 110 has a width 200 that is shown along an x-axis and a height 210 along a y-axis. It should be noted that while the photonic grating is illustrated as having a generally rectangular outline, in further aspects, the photonic grating 110 can be shaped differently. In either case, the exposed face of the photonic grating is generally a 2D structure. Moreover, while the face of the photonic grating has been discussed as being substantially planar, in one or more aspects, the face of the photonic grating 110 includes grating structures 220. In one embodiment, the grating structures 220 function to turn/redirect light waves propagating through the photonic grating 110 to emit the light waves in a direction that is transverse/perpendicular to the face of the photonic grating 110.

The grating structures 220 are spaced across the photonic grating 110 in a grid pattern. In one embodiment, the grid pattern is a regular or semi-regular pattern. However, in general, the grating structures 220 are spaced at intervals within the grid pattern that are a function of characteristics of the light source 140. That is, for example, the grid pattern can define a distance between the grating structures 220 that is a function of a wavelength of light waves generated by the light source. Thus, a lattice structure defined by the grid pattern can space the grating structures at a grating distance on center between the grating structures defined by $d=x\lambda$, where $\lambda$ is the wavelength of the light waves and x is a spacing factor. For example, the spacing factor can be ¼, ⅓, ½, ⅔, ¾, 1, 1¼, and so on. Thus, in general, the distance d between the grating structures 220 is a fraction of the wavelength (e.g., 1550 nm) of the light waves provided into the photonic grating 110 and emitted from the grating structures 220.

The grating structures 220 can be manufactured in different forms depending on, for example, specifications relating to a particular implementation. Accordingly, in one embodiment, the grating structures 220 are surface features of the photonic grating 110. Thus, the grating structures are, in one embodiment, provided with a surface portion that extends above the face of the photonic grating 110. Thus, the surface portion is, for example, of a particular geometry that facilitates emitting light waves from the photonic grating 110. That is, as light waves propagate through the photonic grating 110 in a direction that is substantially parallel with the face of the photonic grating, the grating structures 220 redirect the light waves in a direction transverse to the face of the photonic grating 110 to emit the light waves and form a beam of light that is steered in a desired direction. Accordingly, the surface portion of the grating structures 220 can have a convex geometry that is hemispherical, cuboid, pyramidal, polyhedral, cylindrical, or another suitable shape.

In further aspects, the grating structures 220 are disposed within the face of the photonic grating 110. That is, the grating structures 220 extend downward from the face and have a generally concave geometry that is hemispherical, cuboid, pyramidal, polyhedral, cylindrical, or another suitable shape. In still further aspects, the grating structures 220 are generally planar with the face and do not extend above the face of the photonic grating 110 or below the face in a concave manner.

Instead, in one embodiment, the grating structures 220 are internal structures of the photonic grating 110. In other words, in one embodiment, the grating structures 220 extend from the face of the photonic grating 110 to a bottom surface of the photonic grating 110 that is disposed within the substrate of a silicon photonic circuit of the LIDAR sensor 100. That is, the grating structures 220 are formed of a distinct material in relation to the photonic grating 110. For example, the grating structures 220 are formed from a first material and the photonic grating 110 is formed from a second material that surrounds the grating structures 220 on all sides. In one example, the first material and the second material have separate indexes of refraction. Moreover, a sub-surface portion of the grating structures 220 that is formed from the first material and is disposed within the photonic grating 110 has a geometry that is cuboid, cylindrical, triangular, rhomboid or another suitable geometry.

Additionally, while the distance d between the grating structures 220 is discussed as being a function of the wavelength $\lambda$ of the light source, a width/diameter or other dimension of the grating structures 220 can also be configured according to the wavelength $\lambda$ of the light source 140. That is, in one embodiment, the width of the grating structures 220 is equal to the wavelength $\lambda$, or is provided as a factor thereof. Additionally, in further aspects, the grating structures 220 are comprised of a sub-surface portion and a surface portion in combination instead of in isolation as previously mentioned. That is, the grating structures 220, in one embodiment, include a particular geometry (concave or convex) at the face of the photonic grating 110 in addition to a subsurface portion with a particular geometry extending between the face and a bottom surface of the photonic grating 110. Thus, the grating structures 220 can be manufactured in different configurations in relation to the photonic grating 110; however, the functionality of the grating structures 220 is to act as integrated antenna structures of a phased array that emit light waves from the photonic grating 110.

Continuing with FIG. 1, the LIDAR sensor 100 also includes optical inputs 120 and, in one embodiment, phase shifters 130. The optical inputs 120 are optically connected with the photonic grating 110 along at least one side of the body of the photonic grating 110. Moreover, the optical inputs 120 are also optically connected with the phase shifters 130. Thus, in one configuration, the optical inputs 120 receive the light waves from the phase shifters 130 and provide the light waves into the photonic grating 110 in a direction parallel to the face. As illustrated in FIG. 2, the optical inputs 120 are provided along a single side of the photonic grating 110. Moreover, the optical inputs 120 are, in one embodiment, spaced along the photonic grating 110 in relation the grid pattern of the grating structures 220. That is, for example, each separate one of the optical inputs 120 aligns with a column within the grating structures 220.

Thus, as the phase shifters 130 are configured to provide separate light waves with defined phase differences, the separate optical inputs 120 provide the separate light waves to respective columns of the grating structures 220. Thus, the respective columns of the grating structures 220 receive light waves with distinct phases. For example, the phase difference between a first input of the optical inputs 120 and a second input of the optical inputs that is, for example, adjacent to the first input is $\delta_1$. Accordingly, the phase differences continue between subsequent ones of the optical inputs 120 such that a phase difference between the first input and a third input is $2\delta_1$, a phase difference between the first input and a fourth input is $3\delta_1$, and so on.

Figure 3:
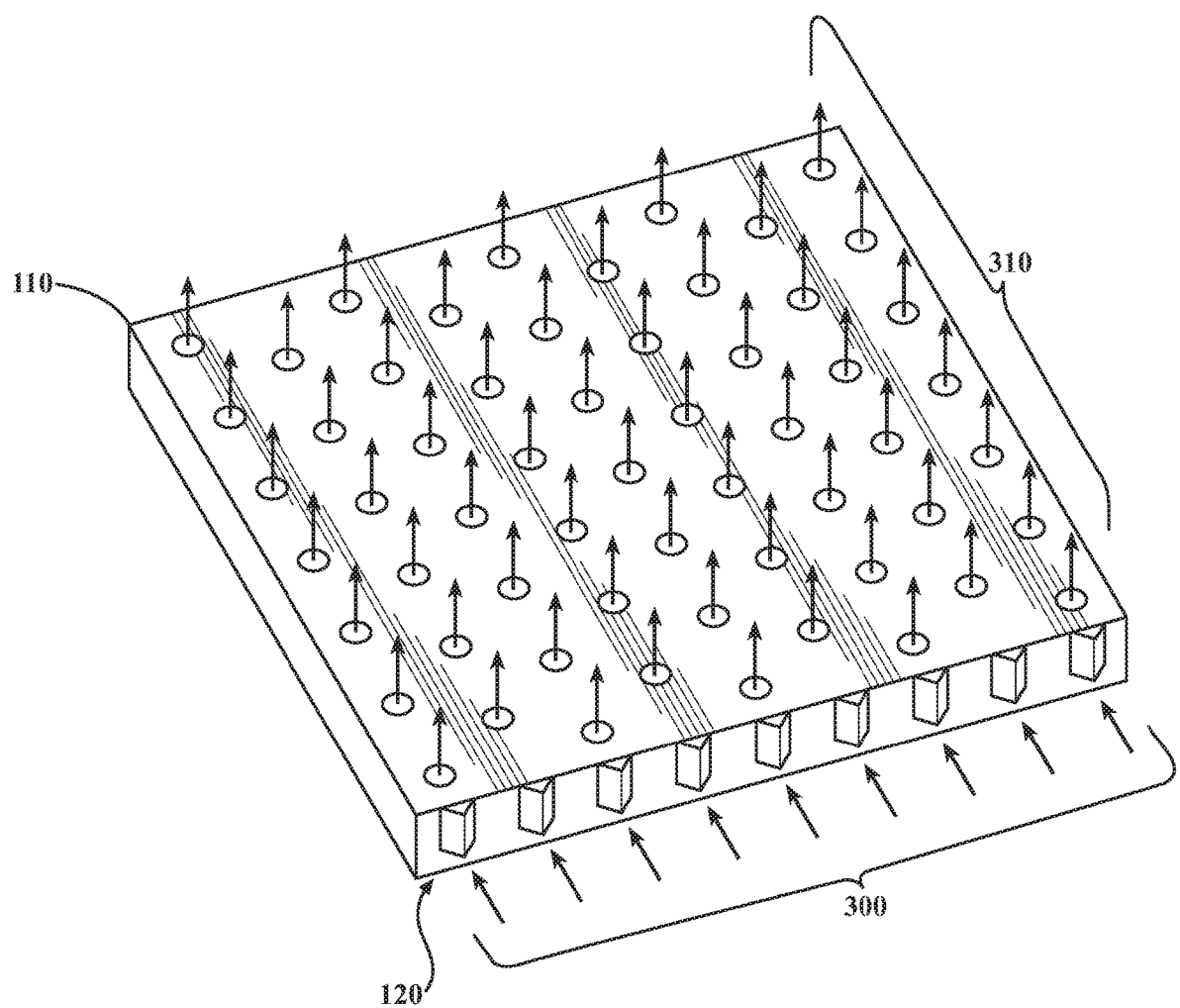
FIG. 3 is a three-dimensional view of the 2D photonic grating of FIG. 2.

As an additional illustration of this correspondence, FIG. 3 illustrates a three-dimensional representation of the photonic grating 110 with the optical inputs 120 situated along a side of the photonic grating 110. The set of arrows 300 represents light waves provided from the phase shifters 130 that each have different phases with respect to each other. Accordingly, FIG. 3 illustrates how the light waves 300 are provided into the photonic grating 110 and are then emitted through the grating structures 220 as emitted light waves 310. Thereafter, the emitted light waves, for example, superpose into a beam of light that is steered in a particular direction according to the differences in phases between the optical inputs 120 and according to further controlling aspects such as a refractive index of the photonic grating 110 and/or a wavelength of the light source 140 from which the light waves are originally produced.

Figure 4:
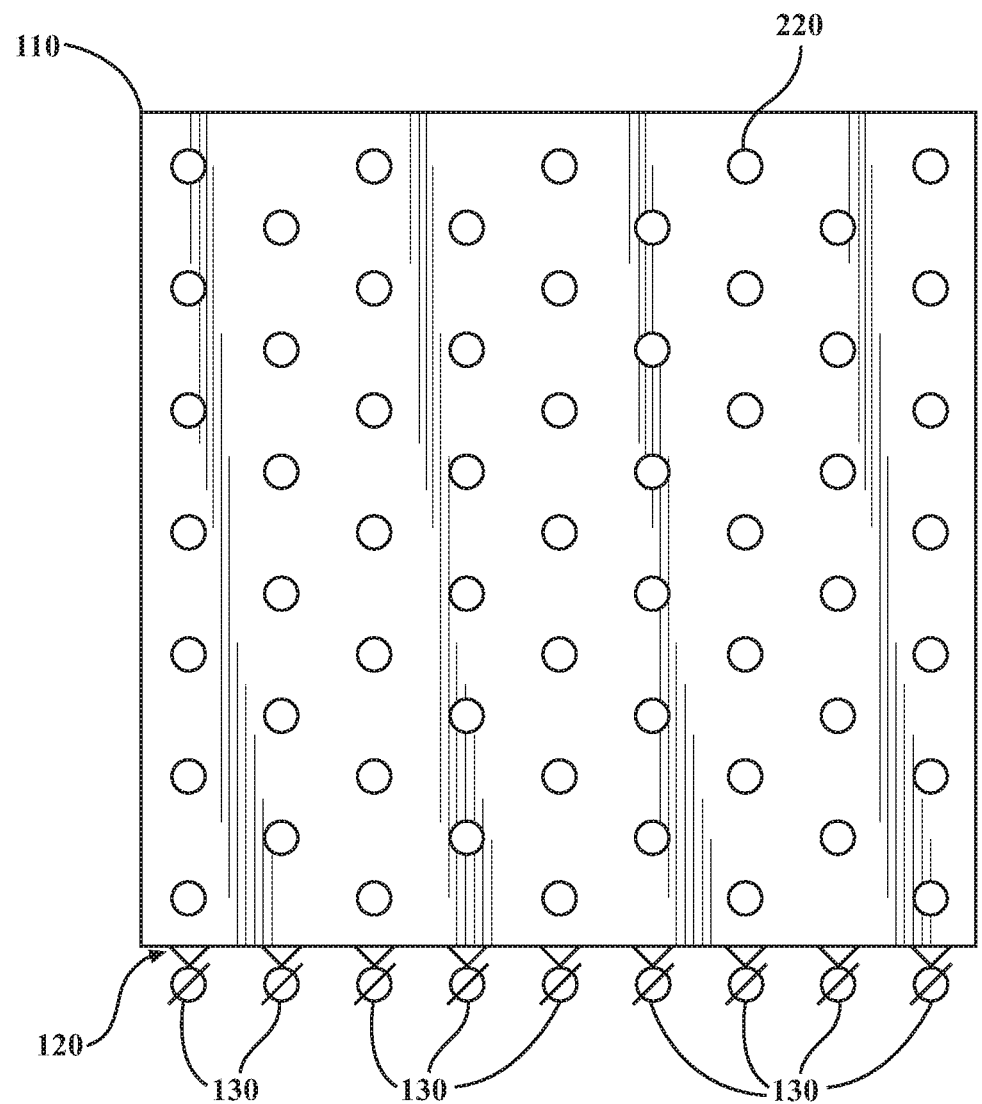
FIG. 4 is a diagram illustrating a top-down view of the 2D photonic grating of FIG. 2 along with an array of phase shifters.

With reference to FIG. 4, a further configuration of the LIDAR sensor 100 is illustrated along with the phase shifters 130. As illustrated in FIG. 4, the photonic grating 110 is depicted from a top-down view and with the phase shifters 130 optically connected with the optical inputs 120. As illustrated in FIG. 4, each of the optical inputs 120 corresponds with a separate one of the phase shifters 130. In general, the phase shifters 130 are, for example, optical wave guides that separately alter light provided from the light source 140 such that an output of each of the phase shifters has a different phase as previously indicated. Furthermore, the phase shifters 130 are, in one embodiment, separately tunable by applying heat and/or electrical current to the phase shifters 130.

For example, as depicted in FIG. 1, control circuitry 150 is operably connected with the phase shifters 130. Accordingly, in one embodiment, the control circuitry 150 functions to electronically control the phase shifters 130 to individually adjust phases of the separate light waves according to a defined phase pattern for the separate optical inputs 120. That is, the control circuitry 150, in one embodiment, individually tunes an extent of phase shift provided by each of the phase shifters 130. Accordingly, the control circuitry 150 can provide dynamic adjustments to the phases of the light waves provided to the photonic grating 110. In this way, the control circuitry 150 can control the phases of the light waves to match particular defined phase patterns to steer a beam of light emitted from the photonic grating 110 in a particular direction.

Moreover, in further aspects, the LIDAR sensor 100 also includes refraction adjustment circuitry (not illustrated). In one embodiment, the refraction adjustment circuitry functions to adjust an index of refraction of the photonic grating 110. Thus, the refraction adjustment circuitry can include thermal and/or electrical components to deliver thermal energy and/or electricity to the photonic grating 110, respectively. In this way, the control circuitry 150 can control the refraction adjustment circuitry to adjust the index of refraction of the photonic grating 110 and thereby more precisely steer the beam of light produced by the photonic grating 110.

Alternatively, or additionally, the control circuitry 150, in one embodiment, controls a wavelength of light produced by the light source 140. The control circuitry 150 can provide an electronic control signal to the light source 140 that causes the light source 140 to produce light according to an indicated wavelength. By dynamically changing the wavelength of the light, in this manner, the control circuitry 150 can further steer the beam of light produced by the photonic grating 110.

Figure 5:
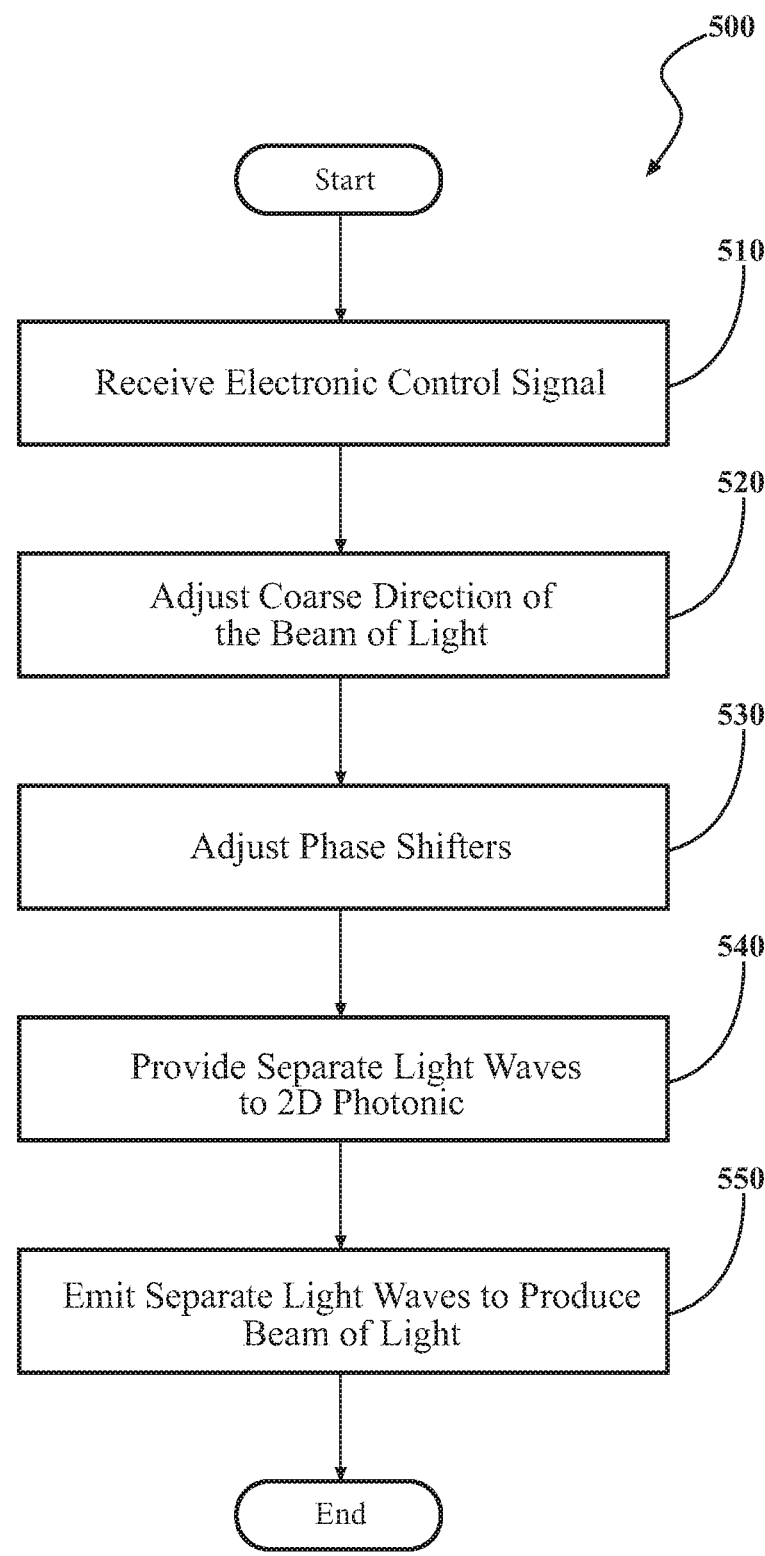
FIG. 5 is a flowchart illustrating one embodiment of a method 500 associated with steering a beam of light using a 2D photonic grating.

Additional aspects of steering the beam of light using the 2D photonic grating as a phased array antenna will be discussed in relation to FIG. 5. FIG. 5 illustrates a flowchart of a method 500 that is associated with steering a beam of light using a 2D photonic grating as a phased array antenna. Method 500 will be discussed from the perspective of the LIDAR sensor 100 of FIG. 1. While method 500 is discussed in combination with the LIDAR sensor 100, it should be appreciated that the method 500 is not limited to being implemented within the LIDAR sensor 100, but is instead one example of a system that may implement the method 500 and associated components.

At 510, an electronic control signal is received that indicates a requested direction in which to steer the beam of light. In one embodiment, the control circuitry 150 receives the electronic control signal from an autonomous driving module, or other electronic entity that processes and/or otherwise uses data produced by the LIDAR sensor 100. For example, in one embodiment, the LIDAR sensor 100 produces point cloud data about a surrounding environment of the LIDAR sensor 100 that is used to detect objects, obstacles, and other aspects of the surrounding environment. The autonomous driving module can use the point cloud data to identify a path through the surrounding environment, identify hazards, track objects, and so on.

In either case, the autonomous driving module can produce the electronic control signal to request sensor data from the LIDAR sensor 100 about a particular locality in the surrounding environment, and/or as an update to the sensor data. Alternatively, or additionally, in one embodiment, the electronic control signal is generated internally to the LIDAR sensor 100 to cause the control circuitry 150 to regularly scan the surrounding environment in a sweeping and repetitive manner in order to continuously provide an updated view of the surrounding environment.

Figure 6:
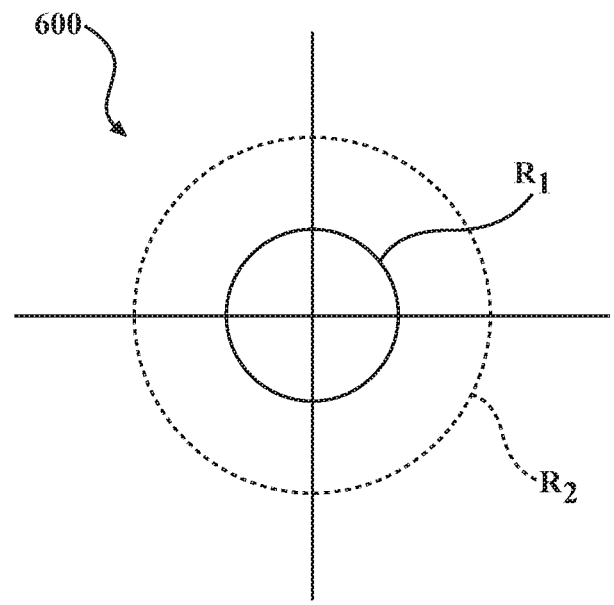
FIG. 6 illustrates graphs that detail how the beam of light is controlled.
Figure 6:
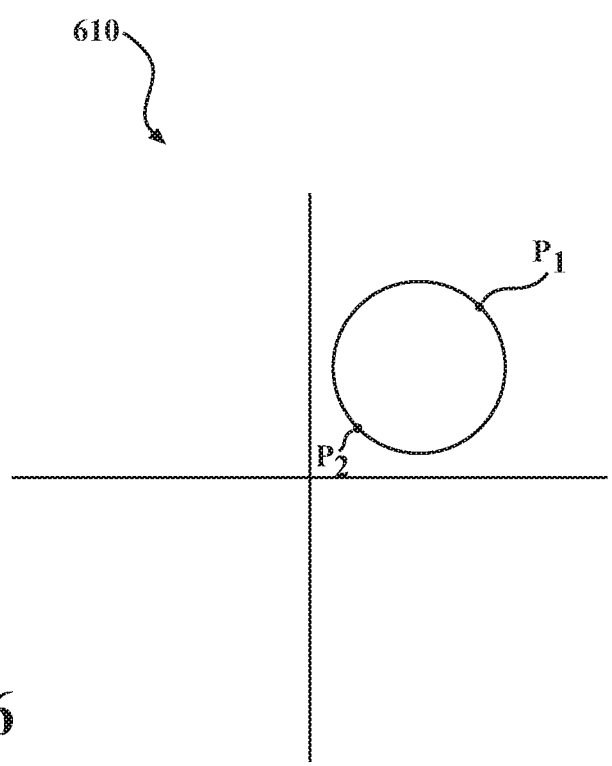

At 520, a coarse direction for the beam of light is adjusted. In one embodiment, the control circuitry 150 adjusts a wavelength of light from the light source 140 to provide coarse adjustment to a direction of the beam of light. For example, with reference to FIG. 6, a graph 600 illustrates two circles with different radii R1, and R2. The two circles represent possible positions for a center of a beam of light according to different selected wavelengths of light. That is, the beam of light can be positioned at any point along the circles defined by the radius R1 or R2 that are associated with separate wavelengths. Thus, by adjusting the wavelength of the light source 140, the control circuitry 150 adjusts a radius of a circle along which the beam of light can be centered.

Alternatively, or additionally, in one embodiment, the control circuitry 150 provides the coarse adjustment to the direction of the beam of light by adjusting a refractive index of the two-dimensional photonic grating 110 as a function of the requested direction. That is, the control circuitry can adjust the radius of the circle as previously indicated with the graph 600 by adjusting the index of refraction for the photonic grating 110. In one embodiment, the control circuitry 150 adjusts the index of refraction by guiding thermal energy (i.e., heat) to and/or from the photonic grating 110 in order to control the temperature of the photonic grating 110 and thereby the index of refraction. Accordingly, the control circuitry 150 can, for example, control one or more thermal energy producing elements to provide heat and/or control one or more thermal cooling elements to remove heat energy from the photonic grating 110.

In further aspects, the photonic grating 110 is n-doped or p-doped and the control circuitry 150 controls one or more transistors to selectively provide an electric current to the photonic grating 110 to adjust the index of refraction. In either case, the resulting adjustment to the index of refraction controls an angle of the beam of light as it is emitted from the photonic grating 110 and thus a radius of the noted circle.

At 530, phases of separate light waves are individually adjusted. In one embodiment, light from the light source 140 is optically guided to an array of phase shifters 130 via splitters, a multiplexor or other optical component that splits the light into multiple waves such that each of the phase shifters receives a separate optical signal/light wave. Thus, the control circuitry 150 can separately tune the phase shifters 130 such that that the phase shifters 130 separately modulate the separate light waves to have distinct phases. In one embodiment, the phase shifters 130 are optical wave guides that are thermally or electrically tuned in a similar manner as previously discussed in order to provide a shift in the phase of optical signals.

In either case, a particular pattern of phases between the respective phase shifters 130 controls, for example, a fine position of the beam of light. For example, with reference to FIG. 6, the graph 610 illustrates separate positions P1 and P2 for a center of the beam along a circle that is provided according to different selected phases. Thus, the control circuitry 150 can provide precise control over a direction of the beam of light by modulating the index of refraction for the photonic grating 110 and/or the wavelength of the light source 140 in combination with adjusting the pattern of phases between the phase shifters 130.

At 540, the separate light waves are provided to the two-dimensional photonic grating 110. In one embodiment, the phase shifters 130 provide the separate light waves via the optical inputs 120 through a side of the photonic grating 110. The optical inputs 120 are, for example, optical waveguides or other optical signal carrying paths within the photonic circuit that comprises the LIDAR sensor 100. Thus, the optical inputs 120 function to provide the light waves into the photonic grating 110 which serves as an integrated monolithic phased array antenna for the LIDAR sensor 100.

At 550, the light waves are emitted to form a beam of light that is directed in the requested direction. In one embodiment, the grating structures 220 embedded in the two-dimensional photonic grating 110 emit the separate light waves. That is, the separate light waves propagate through the photonic grating 110 and interact with the grating structures 220 such that the grating structures 220 redirect the light waves out of the face of the photonic grating 110. Upon being emitted from the photonic grating 110, the separate light waves interact to produce the beam of light that is directed in the requested direction as a function of the control circuitry 150 having modulated the various noted aspects. In this way, the photonic grating 110 in combination with the further discussed components effectively steers the beam of light.

Figure 7:
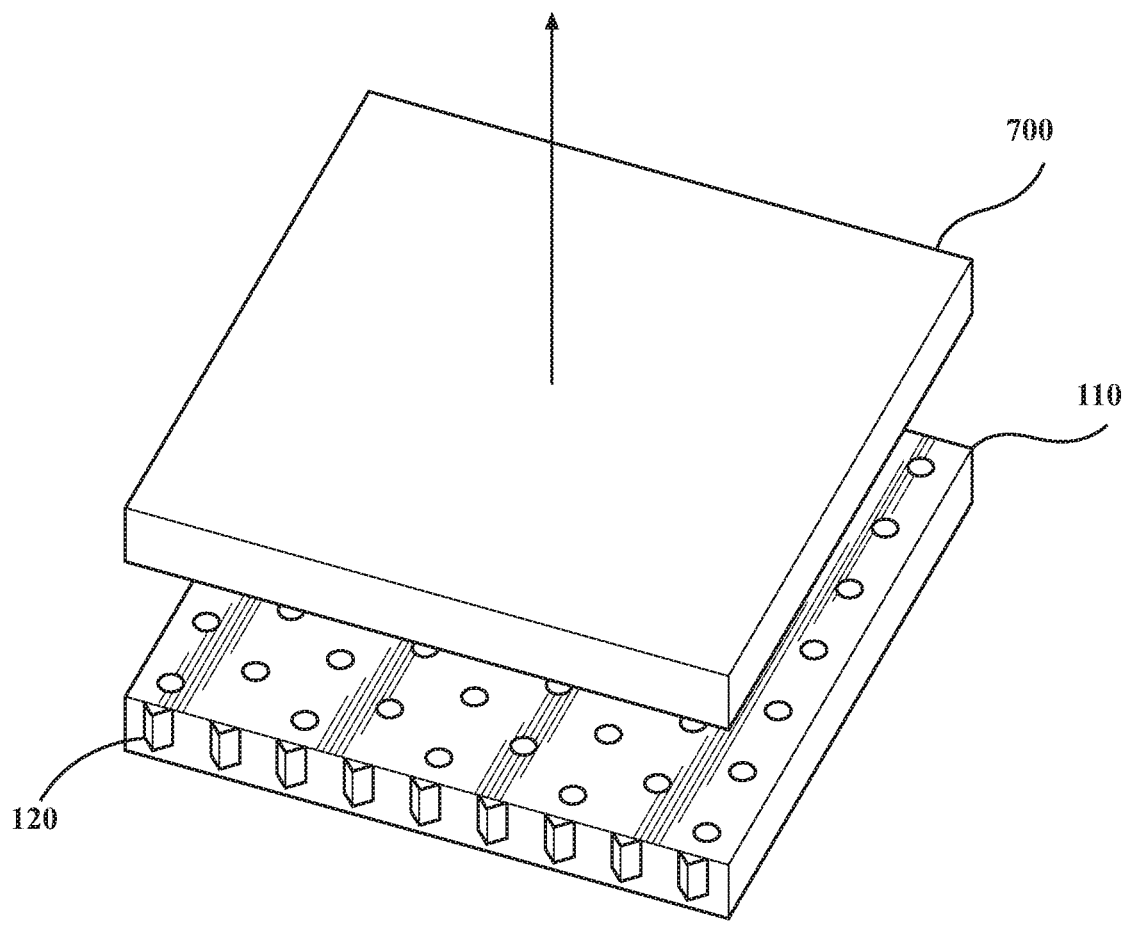
FIG. 7 illustrates one embodiment of the 2D photonic grating stacked with a second photonic grating.

With reference to FIG. 7 a further embodiment of the photonic grating is illustrated. As depicted in FIG. 7, two separate grating substrates are stacked vertically to provide control of the location of the beam of light. For example, FIG. 7 illustrates the photonic grating 110, as previously described, stacked in combination with an additional photonic grating 700. In the illustrated embodiment, the photonic grating 110 is implemented to establish a center circle (e.g., a radius) or other location that defines where the beam is centered. The second photonic grating 700 establishes a second circle along the first circle to further refine a location of the beam of light.

For example, the control circuitry 150 generally functions in the same manner as previously indicated with respect to the photonic grating 110, but also, for example, controls aspects (e.g., index of refraction) of the photonic grating 700 to further refine the direction of the beam of light. Moreover, in the embodiment illustrated in FIG. 7, the photonic grating 110 can be provided without the phase shifters 130 and the second photonic grating 700 instead serves to provide direction control for the beam of light that would otherwise be provided via the phase shifters 130. In this way, the LIDAR sensor 100 can precisely steer the beam of light in a particular direction.

FIG. 1 will now be discussed in further detail as an example environment within which the system and methods disclosed herein may operate. The LIDAR sensor 100 can include one or more processors. In one or more arrangements, the processor(s) can be a main processor of the LIDAR sensor 100. For instance, the processor(s) can be an electronic control unit (ECU). The LIDAR sensor 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby. The term "operably connected," as used throughout this description, can include direct or indirect connections, including connections without direct physical contact, electrical connections, optical connections, and so on.

The one or more data stores can include sensor data. In this context, "sensor data" refers to information produced by the LIDAR sensor 100 from transmitting the beam of light and receiving responses thereto. As will be explained below, the LIDAR sensor 100 can be a part of a sensor system of a vehicle or other device. The sensor system can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors (e.g., multiple LIDAR sensors), the sensors can function independently from each other. Alternatively, two or more of the sensors can work in combination with each other. In such a case, the two or more sensors can form a sensor network. The sensor system and/or the one or more sensors can be operably connected to the processor(s), the data store(s), and/or another element of the LIDAR sensor 100 (including any of the elements shown in FIG. 1). The sensor system can acquire data of at least a portion of the external environment of the LIDAR sensor 100 (e.g., nearby vehicles, obstacles).

As an example, in one or more arrangements, the sensor system can include one or more radar sensors, one or more LIDAR sensors, one or more sonar sensors, and/or one or more cameras. The processor(s), and/or the autonomous driving module(s) can be operably connected to communicate with the various vehicle systems and/or individual components thereof. For example, returning to the processor(s) and/or the autonomous driving module(s) can be in communication to send and/or receive information from the various vehicle systems to control the movement, speed, maneuvering, heading, direction, etc. of a vehicle. The processor(s), and/or the autonomous driving module(s) may control some or all of the systems of a vehicle and, thus, may be partially or fully autonomous.

The LIDAR sensor 100 can include one or more modules. The modules can be implemented as computer-readable program code that, when executed by a processor, implement one or more of the various processes described herein. One or more of the modules can be a component of the processor(s), or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A photonic phased array apparatus for steering a beam of light, comprising:
  a photonic grating having a body that is disposed within a substrate and with a face of the body exposed within the substrate, the photonic grating including grating structures exposed within the face and extending perpendicular to the face within the body across an entire width of the body to a bottom surface that is opposite of the face and having perpendicular sidewalls forming the body, the grating structures being arranged in a grid pattern across the photonic grating, the grating structures being monolithic structures that are static; and
  optical inputs operably connected with the photonic grating along at least one side of the body that is perpendicular to the face, wherein the optical inputs provide separate light waves in parallel into the photonic grating and in a parallel direction with the face and perpendicular to the grating structures, and
  wherein the grating structures redirect the separate light waves to emit the light waves from the photonic grating to form the beam of light.

2. The photonic phased array apparatus of claim 1, further comprising:
phase shifters operably connected with the optical inputs, wherein the phase shifters individually shift a phase of a source light wave that is separately received by the phase shifters to produce the separate light waves with distinct phases.

3. The photonic phased array apparatus of claim 1, wherein a surface portion of the grating structures extends above the face of the photonic grating by a length that is proportional to a wavelength of the separate light waves, and wherein the surface portion has a first geometry and a subsurface portion of the grating structures disposed within the body have a second geometry.

4. The photonic phased array apparatus of claim 3, wherein the first geometry is one of: substantially planar, hemispherical, cuboid, pyramid, and polyhedral, and wherein the second geometry extends through the body of the photonic grating from the face to a bottom surface and is one of: cuboid, cylindrical, triangular, and rhomboid.

5. The photonic phased array apparatus of claim 1, wherein the grid pattern in which the grating structures are arranged includes a grating distance between the grating structures that is related to a wavelength of the separate light waves, wherein the grid pattern is arranged in columns and rows that at least partially align with the optical inputs, and wherein the optical inputs are spaced along the at least one side as a function of the grating distance.

6. The photonic phased array apparatus of claim 1, wherein the grating structures are comprised of a first material, and the body of the photonic grating is composed of a second material that is different than the first material, and wherein the photonic grating is a phased array antenna, the grating structures are sub-antennas formed within the photonic grating, and
wherein the first material is a silicon-based compound.

7. The photonic phased array apparatus of claim 1, further comprising:
refraction adjustment circuitry that dynamically adjusts a refractive index of the photonic grating in order to at least partially steer the beam of light.

8. The photonic phased array apparatus of claim 7, wherein the refraction adjustment circuitry includes circuitry to adjust the refractive index by selectively applying thermal energy to the photonic grating.

9. The photonic phased array apparatus of claim 7, further comprising:
control circuitry operably connected with phase shifters that attached to the optical inputs and that controls the phase shifters to individually adjust phases of the separate light waves to cause the phases of the respective separate light waves to be distinct according to a defined phase pattern, wherein the control circuitry controls the refraction adjustment circuitry to dynamically adjust the refractive index in combination with controlling the phase shifters to adjust the phases in order to steer the beam of light.

10. A phased-array light detection and ranging (LIDAR) device, comprising:
a phase shifting array that separately shifts a phase of a source light wave to produce separate light waves with distinct phases;
optical inputs operably connected with the phase shifting array to receive the separate light waves; and
a photonic grating operably connected with the optical inputs to receive the separate light waves and having a body that is disposed within a substrate with a face of the body exposed within the substrate, the photonic grating including grating structures exposed within the face and extending across an entire width of the body to a bottom surface that is opposite of the face and having perpendicular sidewalls forming the body,
wherein the grating structures redirect the separate light waves to emit the light waves from the photonic grating to form a beam of light, the grating structures being monolithic structures that are static.

11. The phased-array LIDAR device of claim 10, wherein the grating structures extend perpendicular to the face within the body and are arranged in a grid pattern across the photonic grating,
wherein the optical inputs are operably connected to the photonic grating along at least one side of the body that is perpendicular to the face, and wherein the optical inputs provide the separate light waves in a parallel direction with the face and perpendicular to the grating structures.

12. The phased-array LIDAR device of claim 11, wherein the grid pattern in which the grating structures are arranged includes a grating distance between the grating structures that is related to a wavelength of the separate light waves, wherein the grid pattern is arranged in columns and rows that at least partially align with the optical inputs, and wherein the optical inputs are spaced along the at least one side as a function of the grating distance.

13. The phased-array LIDAR device of claim 10, wherein a surface portion of the grating structures extends above the face of the photonic grating by a length that is proportional to a wavelength of the separate light waves.

14. The phased-array LIDAR device of claim 10, wherein the grating structures are comprised of a first material and the body of the photonic grating is composed of a second material that is different than the first material, and wherein the photonic grating is a phased array antenna and the grating structures are sub-antennas formed within the photonic grating.

15. The phased-array LIDAR device of claim 10, further comprising:
refraction adjustment circuitry that dynamically adjusts a refractive index of the photonic grating in order to at least partially steer the beam of light.

16. The phased-array LIDAR device of claim 15, wherein the refraction adjustment circuitry includes circuitry to adjust the refractive index by selectively applying thermal energy to the photonic grating.

17. A method for steering a beam of light using a two-dimensional photonic grating, comprising:
in response to an electronic control signal that indicates a requested direction in which to steer the beam of light, adjusting, using an array of phase shifters, a phase of a light source to produce separate light waves with distinct phases;
providing, from the array of phase shifters via optical inputs, the separate light waves to the two-dimensional photonic grating; and
emitting, using grating structures embedded in the two-dimensional photonic grating that extend through an entire width of a body of the two-dimensional photonic grating and are monolithic structures that are static, the separate light waves to produce the beam of light that is directed in the requested direction, wherein the grating structures extend between a bottom surface that is opposite a face of the two-dimensional photonic grating and have perpendicular sidewalls forming the body.

18. The method of claim 17, further comprising:
adjusting a wavelength of light from a light source that is provided to the array of phase shifters as a function of the requested direction, wherein the phase shifters of the array are individually connected with the two-dimensional photonic grating, and wherein adjusting the wavelength in combination with adjusting the phase controls the beam of light to be emitted in the requested direction.

19. The method of claim 17, further comprising:
adjusting a refractive index of the two-dimensional photonic grating as a function of the requested direction, wherein adjusting the refractive index in combination with adjusting the phase controls the beam of light to be emitted in the requested direction.

20. The method of claim 17, wherein emitting the separate light waves from the photonic grating causes the separate light waves to combine to form the beam of light that is directed in the requested direction.

* * * * *